(12) United States Patent
Shen et al.

(10) Patent No.: US 11,064,112 B2
(45) Date of Patent: Jul. 13, 2021

(54) IMAGE DISPLAY METHOD AND DEVICE, AND ELECTRONIC DEVICE

(71) Applicant: Advanced New Technologies Co., Ltd., George Town (KY)

(72) Inventors: Lingnan Shen, Hangzhou (CN); Jie Qi, Hangzhou (CN); Fen Zhai, Shanghai (CN); Zhixiang Tang, Hangzhou (CN); Huifeng Jin, Shanghai (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/686,415

(22) Filed: Nov. 18, 2019

(65) Prior Publication Data

US 2020/0084370 A1 Mar. 12, 2020

Related U.S. Application Data

(63) Continuation of application No. PCT/CN2018/101445, filed on Aug. 21, 2018.

(30) Foreign Application Priority Data

Aug. 24, 2017 (CN) .......................... 201710734888.5

(51) Int. Cl.
*H04N 5/232* (2006.01)
*G06K 9/00* (2006.01)
*H04N 5/262* (2006.01)

(52) U.S. Cl.
CPC ..... *H04N 5/23222* (2013.01); *G06K 9/00255* (2013.01); *G06K 9/00912* (2013.01); *H04N 5/2628* (2013.01)

(58) Field of Classification Search
CPC ...... G06K 9/00; G06K 7/1095; G06K 7/1417; G06K 7/1447; G06K 7/146;
(Continued)

(56) References Cited

U.S. PATENT DOCUMENTS 4,920,255 A * 4/1990 Gabeler ............. G06K 7/10801
235/454
5,659,167 A * 8/1997 Wang ................... G06K 7/1095
235/462.08
(Continued)

FOREIGN PATENT DOCUMENTS

CN 102833486 12/2012
CN 105787404 7/2016
(Continued)

OTHER PUBLICATIONS

PCT International Search Report and Written Opinion in International Application No. PCT/CN2018/101445, dated Nov. 23, 2018, 10 pages (with partial English translation).
(Continued)

*Primary Examiner* — Dramos Kalapodas
(74) *Attorney, Agent, or Firm* — Fish & Richardson P.C.

(57) ABSTRACT

An end-user device displays an image at a first size. The end-user device obtains a distance between the end-user device and an object. The end-user device includes a predetermined mapping relationship between distance and size. The end-user device determines a second size based on the distance and the predetermined mapping relationship. The end-user device displays the image at the second size.

20 Claims, 10 Drawing Sheets

(58) Field of Classification Search
CPC .......... G06K 9/00255; G06K 9/00912; H04N 5/232; H04N 5/23222; H04N 5/2628; H04W 88/02; G09G 5/00
See application file for complete search history.

(56) References Cited

U.S. PATENT DOCUMENTS

| | | | | |
|---|---|---|---|---|
| 7,203,911 | B2* | 4/2007 | Williams | G06F 3/011 |
| | | | | 345/158 |
| 7,639,935 | B2* | 12/2009 | Bartilson | G03B 13/12 |
| | | | | 396/78 |
| 8,209,635 | B2* | 6/2012 | Thom | G06F 1/1626 |
| | | | | 345/156 |
| 8,736,615 | B2* | 5/2014 | Slavin | G02B 6/006 |
| | | | | 345/441 |
| 9,342,752 | B1 | 5/2016 | Lee et al. | |
| 9,704,216 | B1* | 7/2017 | Laskar | G06F 3/012 |
| 9,813,693 | B1* | 11/2017 | Baldwin | H04N 13/239 |
| 10,061,954 | B2* | 8/2018 | Fefferman | G06Q 20/208 |
| 2003/0123069 | A1 | 7/2003 | Perala | |
| 2008/0073434 | A1* | 3/2008 | Epshteyn | G06K 7/10 |
| | | | | 235/454 |
| 2010/0188426 | A1* | 7/2010 | Ohmori | G06F 3/012 |
| | | | | 345/660 |
| 2011/0084897 | A1 | 4/2011 | Manoharan et al. | |
| 2013/0029723 | A1* | 1/2013 | Das | H04M 1/72454 |
| | | | | 455/557 |
| 2013/0119124 | A1* | 5/2013 | Rothschild | G06F 16/5838 |
| | | | | 235/375 |
| 2014/0022351 | A1 | 1/2014 | Cho et al. | |
| 2014/0105450 | A1 | 4/2014 | Berkeley et al. | |
| 2014/0201126 | A1 | 7/2014 | Zadeh et al. | |
| 2014/0362211 | A1 | 12/2014 | Ohwaki et al. | |
| 2015/0055085 | A1 | 2/2015 | Fonte et al. | |
| 2016/0012465 | A1* | 1/2016 | Sharp | G06Q 20/386 |
| | | | | 705/14.17 |
| 2016/0328590 | A1 | 11/2016 | Fefferman | |
| 2017/0359536 | A1 | 12/2017 | Lee et al. | |

FOREIGN PATENT DOCUMENTS

| | | |
|---|---|---|
| CN | 106529449 | 3/2017 |
| CN | 106778434 | 5/2017 |
| CN | 106919247 | 7/2017 |
| CN | 107633398 | 1/2018 |
| TW | 201428638 | 7/2014 |

OTHER PUBLICATIONS

PCT International Preliminary Report on Patentability in International Application No. PCT/CN2018/101445, dated Feb. 25, 2020, 10 pages (with English translation).

* cited by examiner

IMAGE DISPLAY METHOD AND DEVICE, AND ELECTRONIC DEVICE

CROSS-REFERENCE TO RELATED APPLICATIONS

This application is a continuation of PCT Application No. PCT/CN2018/101445, filed on Aug. 21, 2018, which claims priority to Chinese Patent Application No. 201710734888.5, filed on Aug. 24, 2017, and each application is hereby incorporated by reference in its entirety.

TECHNICAL FIELD

Implementations of the present specification relate to the field of Internet technologies, and in particular, to an image display method and device, and an electronic device.

BACKGROUND

With the continuous development of Internet technologies, especially continuous popularization of mobile devices, there are increasingly more scenarios of scanning an image to execute a related service, for example, scanning for ticket collection or scanning for payment. In actual use, a user enables an end-user device that displays an image to be scanned to face a scanning device. A size of the image displayed by the end-user device is usually fixed, but a distance between the end-user device of each user and the scanning device is not fixed. Therefore, in many cases, the staff needs to continually move the scanning device to identify an optimal distance to complete scanning. For example, if the user is relatively far away from the scanning device, the image appears very small for the scanning device, and it is unlikely to perform successful scanning. Therefore, the staff operating the scanning device needs to move the scanning device to approach the end-user device, and identifies the optimal distance to complete scanning. If the user is relatively close to the scanning device, the image appears very large for the scanning device, and it is also unlikely to perform successful scanning. Therefore, the staff needs to move the scanning device to keep away from the end-user device, and identifies the optimal distance to complete scanning.

SUMMARY

Implementations of the present specification provide an image display method and device, and an electronic device.

According to a first aspect of an implementation of the present specification, an image display method is provided, and the method includes the following: determining an image currently displayed in an end-user device; obtaining a distance between the end-user device and a scanning device that is detected by a detection device, where the scanning device is configured to scan the displayed image; calculating a first size of the image based on the distance; and adjusting a size of the currently displayed image to the first size.

According to a second aspect of an implementation of the present specification, an image display method is provided, and the method includes the following: determining a facial image currently displayed in an end-user device; obtaining a distance between the end-user device and a human face that is detected by a detection device; calculating a first size of the facial image based on the distance; and adjusting a size of the currently displayed facial image to the first size.

According to a third aspect of an implementation of the present specification, an image display device is provided, and the device includes the following: a determining unit, configured to determine an image currently displayed in an end-user device; an acquisition unit, configured to obtain a distance between the end-user device and a scanning device that is detected by a detection device, where the scanning device is configured to scan the displayed image; a calculation unit, configured to calculate first size of the image based on the distance; and a display unit, configured to adjust a size of the currently displayed image to the first size.

According to a fourth aspect of an implementation of the present specification, an image display device is provided, and the device includes the following: a determining unit, configured to determine a facial image currently displayed in an end-user device; an acquisition unit, configured to obtain a distance between the end-user device and a human face that is detected by a detection device; a calculation unit, configured to calculate a first size of the facial image based on the distance; and a display unit, configured to adjust a size of the currently displayed facial image to the first size.

According to a fifth aspect of an implementation of the present specification, an electronic device is provided, and includes the following: a processor; and a memory, configured to store an instruction that can be executed by the processor.

The processor is configured to: determine an image currently displayed in an end-user device; obtain a distance between the end-user device and a scanning device that is detected by a detection device, where the scanning device is configured to scan the displayed image; calculate a first size of the image based on the distance; and adjust a size of the currently displayed image to the first size.

According to a sixth aspect of an implementation of the present specification, an electronic device is provided, and includes the following: a processor; and a memory, configured to store an instruction that can be executed by the processor.

The processor is configured to: determine a facial image currently displayed in an end-user device; obtain a distance between the end-user device and a human face that is detected by a detection device; calculate a first size of the facial image based on the distance; and adjust a size of the currently displayed facial image to the first size.

According to the implementations of the present specification, a user can enable the end-user device that displays the image to be scanned to face the scanning device at any location that is at a distance from the scanning device. The detection device in the end-user device can detect the distance between the end-user device and the scanning device. Then the end-user device calculates, based on the distance detected by the detection device, a first size (such as, a target size) for conveniently scanning the image by the scanning device, and finally can adjust the size of the displayed image to the first size. The image of an adjusted size is scanned by the scanning device conveniently, thereby increasing a scanning success rate.

DESCRIPTION OF IMPLEMENTATIONS

Figure 1:
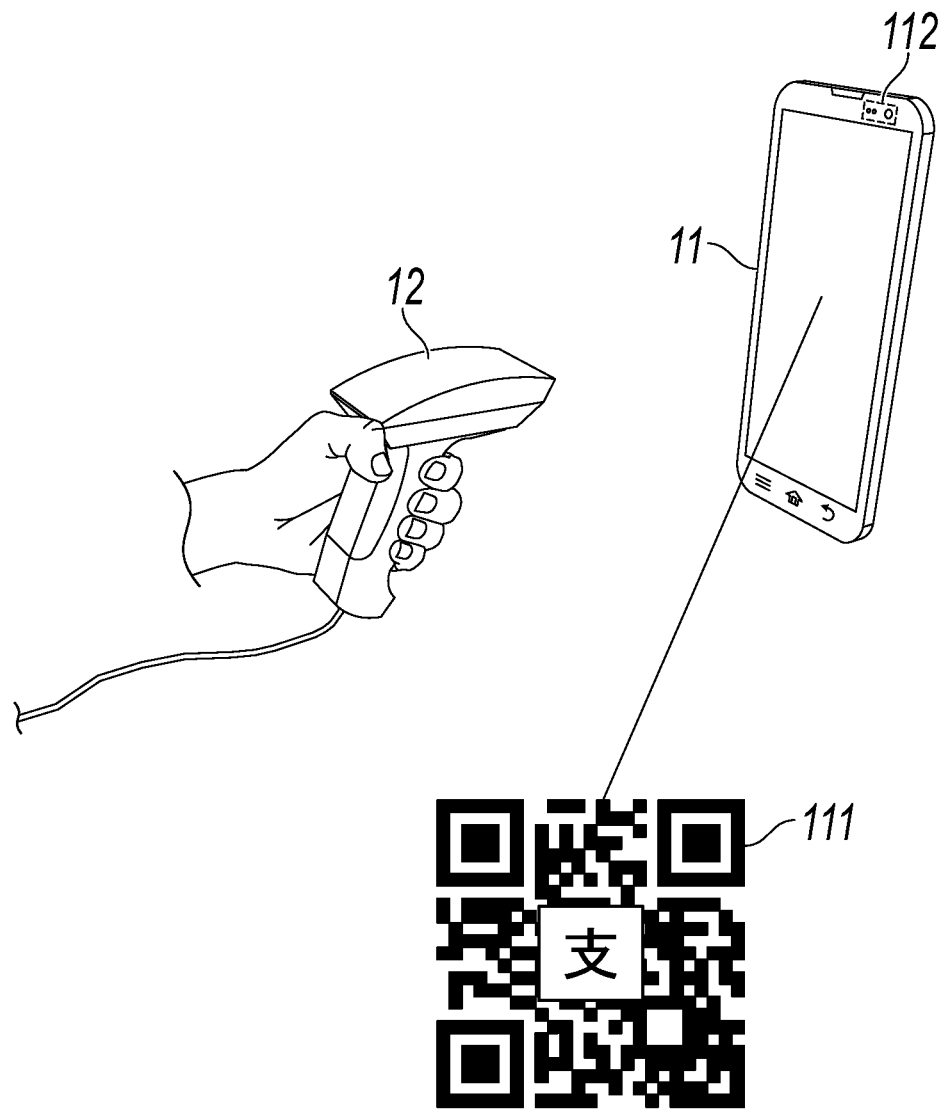
FIG. 1 is a structural diagram illustrating an image display system, according to an implementation of the present specification.

Example implementations are described in detail here, and presented in the accompanying drawings. When the following description relates to the accompanying drawings, unless specified otherwise, same numbers in different accompanying drawings represent same or similar elements. The implementations described in the following example implementations do not represent all implementations consistent with the present specification. On the contrary, the implementations are only examples of devices and methods that are described in the appended claims in detail and consistent with some aspects of the present specification.

The terms used in the present specification are merely used for the purpose of describing specific implementations, and are not intended to limit the present specification. The terms "a", "said", and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms of first, second, third, etc. can be used in the present specification to describe various types of information, the information is not limited to the terms. These terms are only used to differentiate information of a same type. For example, without departing from the scope of the present specification, first information can also be referred to as second information. Similarly, the second information can also be referred to as the first information. Depending on the context, for example, the word "if" used here can be explained as "while", "when", or "in response to determining".

As described above, in actual use, a user enables an end-user device that displays an image to be scanned to face a scanning device. A size of the image displayed by the end-user device is usually fixed, but a distance between the end-user device of each user and the scanning device is not fixed. Therefore, in many cases, the staff needs to continually move the scanning device to identify an optimal distance (such as, a target distance) to complete scanning. For example, the scanning device may have a default working distance. If the user is relatively far away from the scanning device, the image appears very small for the scanning device, and it is unlikely to perform successful scanning. Therefore, the staff operating the scanning device needs to move the scanning device to approach the end-user device, and identifies the optimal distance to complete scanning. If the user is relatively close to the scanning device, the image appears very large for the scanning device, and it is also unlikely to perform successful scanning. Therefore, the staff needs to move the scanning device to keep away from the end-user device, and identifies the optimal distance to complete scanning.

A more efficient image display scheme needs to be provided to increase a scanning success rate.

FIG. 1 is a structural diagram illustrating an image display system, according to an implementation of the present specification. The system shown in FIG. 1 can include an end-user device 11 of a user and a scanning device 12.

The end-user device 11 can be configured to display an image 111 to be scanned, and the end-user device 11 can be further provided with a detection device 112. The detection device 112 can be configured to detect a distance between the end-user device 11 and the scanning device 12.

The scanning device 12 can be configured to scan the image 111 displayed by the end-user device 11, to perform a related service procedure. For example, the end-user device 11 can display a payment code image (as shown in FIG. 1) in a payment scenario, and therefore the scanning device 12 can complete a collection procedure through code scanning. For another example, the end-user device 11 can display a ticket collection code image in a ticket collection scenario, and therefore the scanning device 12 can complete authentication through code scanning, to issue a bill (which can be a paper bill or an electronic bill).

In actual use, the user can enable the end-user device 11 that displays the image 111 to be scanned to face the scanning device 12 at any location that is at a distance from the scanning device 12. The end-user device 11 can automatically adjust a size of the displayed image 111 (for example, increase the size of the image 111 or decrease the size of the image 111) based on the distance detected by the detection device, thereby helping the scanning device 12 efficiently perform scanning.

Figure 2:
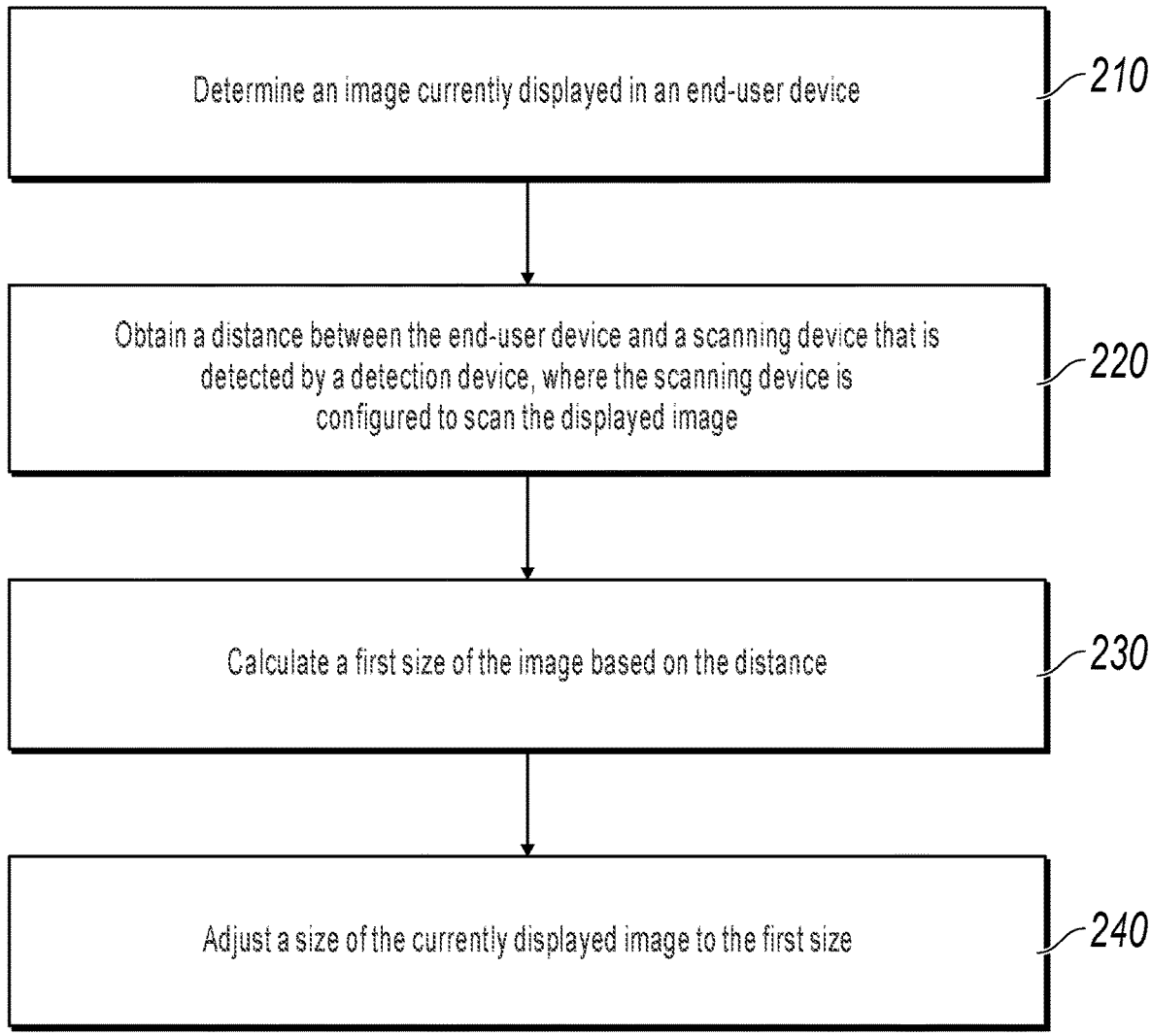
FIG. 2 is a flowchart illustrating an image display method, according to an implementation of the present specification.

The following describes an implementation of an image display method in the present specification with reference to an example shown in FIG. 2. As shown in FIG. 2, the method can include the following steps.

Step 210: Determine an image currently displayed in an end-user device.

In the present implementation, the image can be a graphic code, for example, a two-dimensional code or a bar code.

Step 220: Obtain a distance between the end-user device and a scanning device that is detected by a detection device, where the scanning device is configured to scan the displayed image.

In an implementation, the detection device includes a distance sensor, and the obtaining a distance between the end-user device and a scanning device that is detected by a detection device in step 220 includes the following: obtaining the distance between the end-user device and the scanning device that is detected by the distance sensor.

Figure 3:
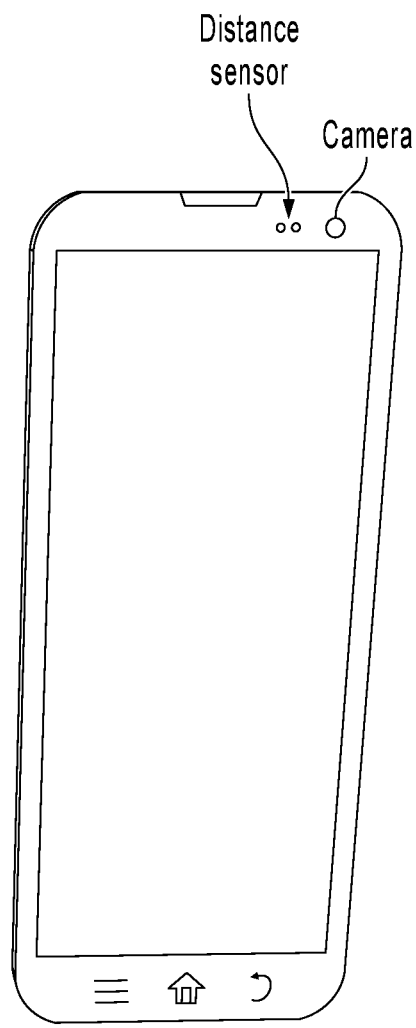
FIG. 3 is a schematic diagram illustrating a detection device, according to an implementation of the present specification.

The end-user device usually can be provided with the distance sensor (as shown in FIG. 3). In the present specification, the distance sensor can be configured to detect the distance between the end-user device and the scanning device, and report the detected distance to the end-user device.

The distance sensor can include two components, one component can emit an infrared ray and the other component can detect an infrared ray. A working principle is as follows: An emitted infrared ray is reflected by an obstacle (the scanning device described in the present specification), and the reflected infrared ray is detected by a component configured to detect an infrared ray. A distance between the end-user device and the obstacle can be calculated based on duration from a moment for emitting an infrared ray to a moment for detecting the infrared ray and an infrared speed.

In another implementation, the detection device includes a camera of the end-user device, and the obtaining a distance between the end-user device and a scanning device that is detected by a detection device includes the following: obtaining an image of the scanning device captured by the camera; and determining the distance between the end-user device and the scanning device based on the image of the scanning device.

The camera of the end-user device usually includes a front-facing camera (as shown in FIG. 3), or can include a rotary camera, a flip camera, etc.

After obtaining the image of the scanning device captured by the camera, the end-user device can calculate the current distance between the end-user device and the scanning device based on an image processing algorithm.

In addition, the distance can alternatively be a relatively accurate distance jointly determined by the distance sensor and the camera.

In the present specification, the scanning device can include a handheld code scanner, a fixed code scanner, etc.

Step 230: Calculate a first size (such as, a target size) of the image based on the distance. For example, the end-user device may have a preset target size of the image corresponding to the distance.

In an implementation, the end-user device can predetermine a mapping relationship between a distance and a first size.

For example, the first size corresponding to the distance of three meters is 3 cm×3 cm.

The first size corresponding to the distance of five meters is 5 cm×5 cm.

The first size corresponding to the distance of 10 meters is 10 cm×10 cm.

Currently, the finally determined optimal size further needs to be determined based on an actual screen size of the end-user device. For example, the finally determined optimal size can be the screen size when the calculated optimal size is larger than the screen size of the end-user device.

In another implementation, the end-user device can calculate the first size based on a local calculation model.

The calculation model can be provided by a service side server. For example, a third-party server is a payment application platform in a payment scenario, or the third-party server can be a ticket selling application platform in a ticket collection scenario.

The model usually can be obtained based on massive data training performed on the distance and the first size. The end-user device inputs the obtained distance into the calculation model to obtain the first size to be output.

Step 240: Adjust a size of the currently displayed image to the first size.

The user can enable the end-user device that displays the image to be scanned to face the scanning device at any location that is at a distance from the scanning device. The detection device in the end-user device can detect the distance between the end-user device and the scanning device. Then the end-user device calculates, based on the distance detected by the detection device, the first size for conveniently scanning the image by the scanning device, and finally can adjust the size of the displayed image to the first size. The image of an adjusted size is scanned by the scanning device conveniently, thereby increasing a scanning success rate.

Figure 4:
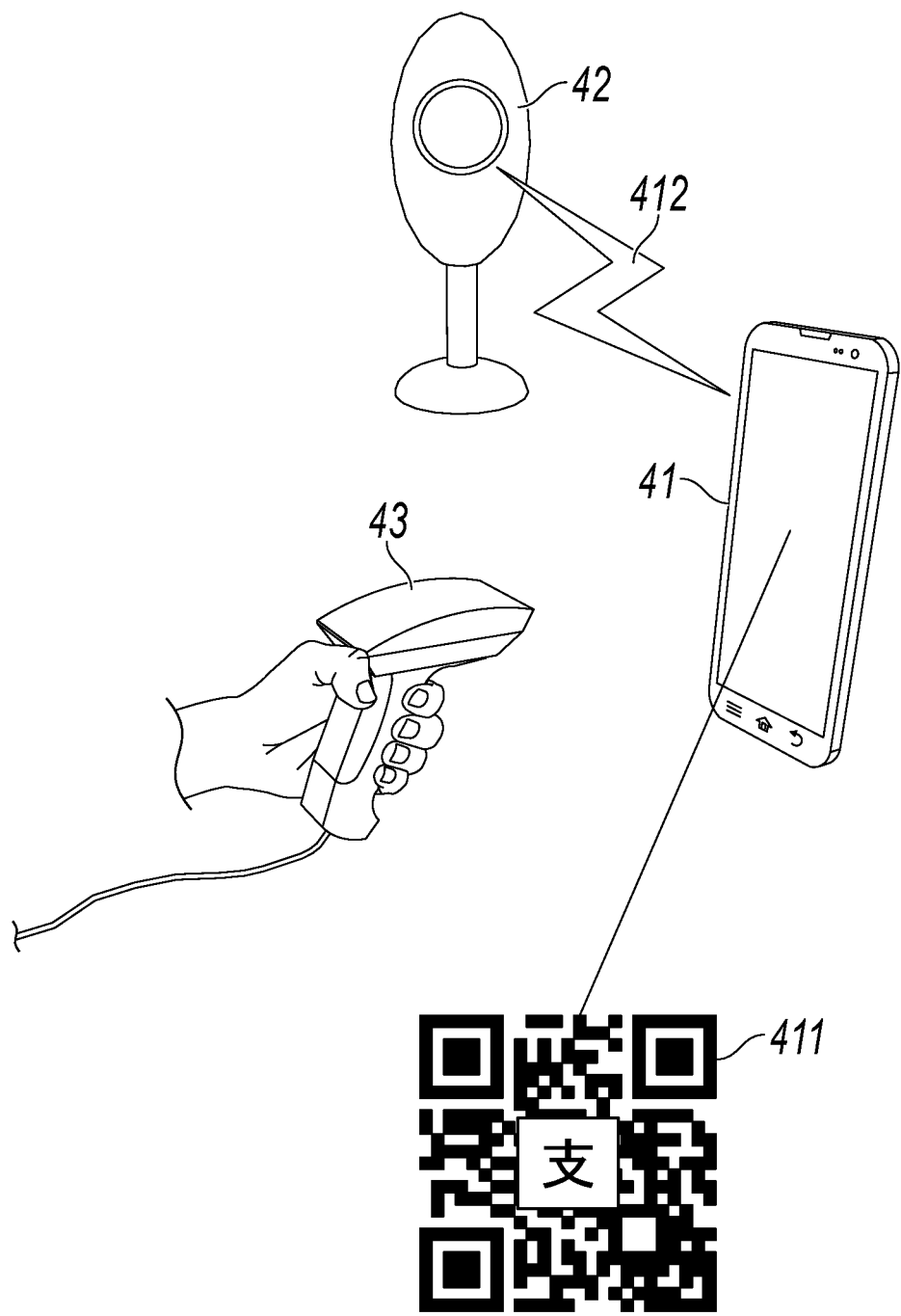
FIG. 4 is a structural diagram illustrating an image display system, according to an implementation of the present specification.

FIG. 4 is a structural diagram illustrating another image display system, according to an implementation of the present specification. The system 400 shown in FIG. 4 can include an end-user device 41 of a user, a detection device 42, and a scanning device 43.

The end-user device 41 can be configured to display an image 411 to be scanned.

The detection device 42 can be configured to detect a distance between the end-user device 41 and the scanning device 43.

The end-user device 41 and the detection device 42 can be integrated with short-range wireless communications modules, such as a Bluetooth (Bluetooth) module, an infrared (IrDA) module, a wireless local area network (Wi-Fi or WLAN mostly using a series of 802.11 protocols) module, a Wi-Fi direct (Wi-Fi Direct) module, an ultra-wideband (UWB) module, a ZigBee (ZigBee) module, and a near field communication (NFC) module, to implement short-range wireless signal transmission and reception. By using the short-range wireless communications modules, a short-range wireless connection 412 can be established between the end-user device 41 and the detection device 42. As such, the detection device 42 can send the distance to the end-user device 41 through the short-range wireless connection 412 after detecting the distance between the end-user device 41 and the scanning device 43.

The scanning device 43 can be configured to scan the image 411 displayed by the end-user device 41, to perform a related service procedure. For example, the end-user device 41 can display a payment code image (as shown in FIG. 4) in a payment scenario, and therefore the scanning device 43 can complete a collection procedure through code scanning. For another example, the end-user device 41 can display a ticket collection code image in a ticket collection scenario, and therefore the scanning device 43 can complete authentication through code scanning, to issue a bill (which can be a paper bill or an electronic bill).

In actual use, the user can enable the end-user device 41 that displays the image 411 to be scanned to face the scanning device 43 at any location that is at a distance from the scanning device 43. The detection device 42 sends the detected distance to the end-user device 41. The end-user device 41 automatically adjusts a size of the displayed image 411 (for example, increases the size of the image 411 or decreases the size of the image 411) based on the received distance, thereby helping the scanning device 43 efficiently perform scanning.

Figure 5:
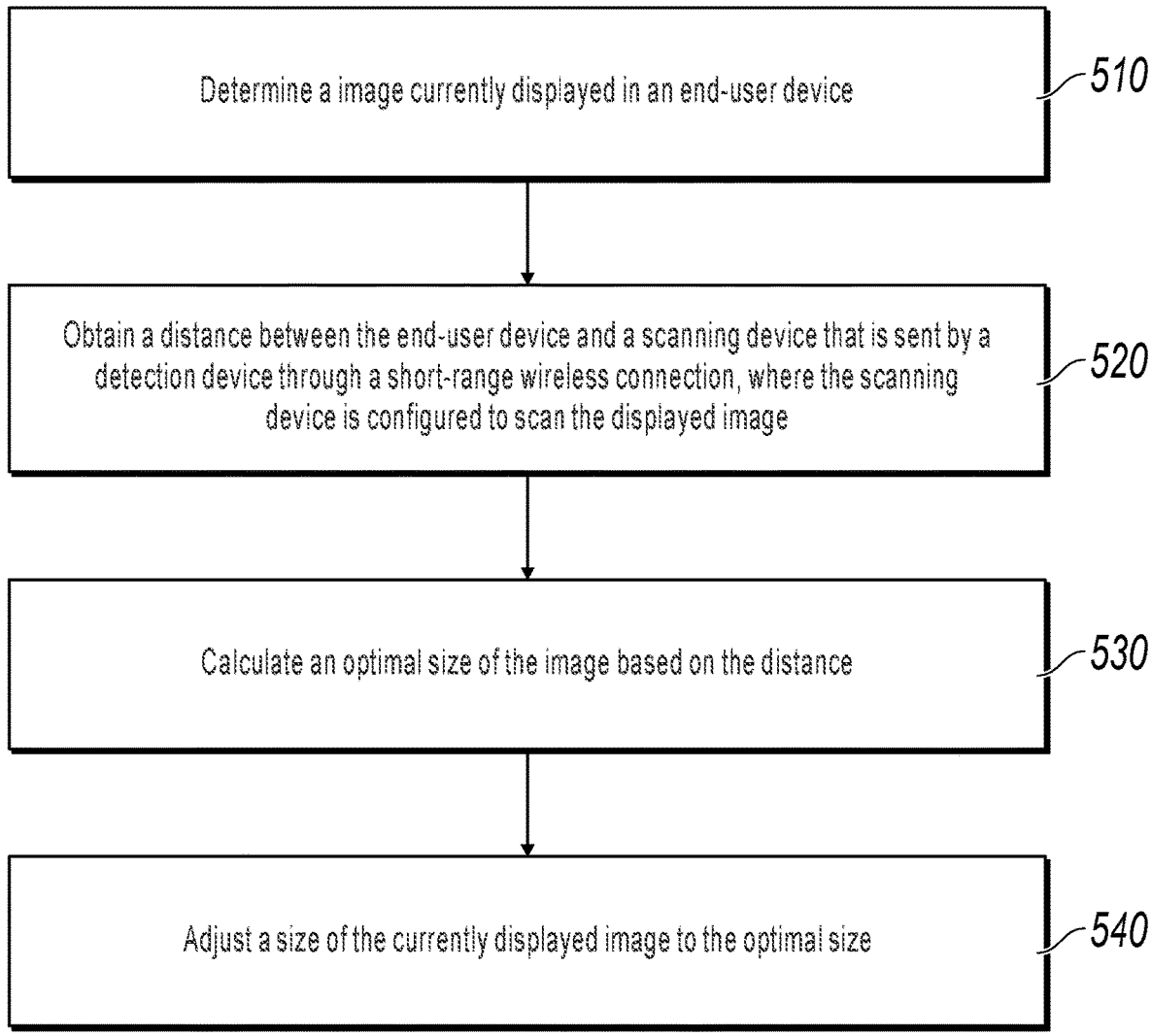
FIG. 5 is a flowchart illustrating an image display method, according to an implementation of the present specification.

The following describes an implementation of an image display method in the present specification with reference to an example shown in FIG. 5. As shown in FIG. 5, the method can include the following steps.

Step 510: Determine an image currently displayed in an end-user device.

The present step is the same as step 110. Details are omitted here for simplicity.

Step 520: Receive a distance between the end-user device and a scanning device that is detected by a detection device through a short-range wireless connection, where the scanning device is configured to scan the displayed image.

The short-range wireless connection includes one of Bluetooth, infrared, a wireless local area network, Wi-Fi, ultra-wideband communication, ZigBee, and near field communication.

The detection device can be integrated with a distance sensor and/or a camera. The distance sensor and the camera are the same as those in the previous implementations. Details are omitted here for simplicity.

Step 530: Calculate a first size of the image based on the distance.

The present step is the same as step 130. Details are omitted here for simplicity.

Step 540: Adjust a size of the currently displayed image to the first size.

The present step is the same as step 140. Details are omitted here for simplicity.

A difference between the present implementation and the previous implementation is as follows: In the present implementation, the detection device is a third-party detection device other than the end-user device, the detection device establishes the short-range wireless connection to the end-user device, and the distance is sent by the detection device through the short-range wireless connection.

Figure 6:
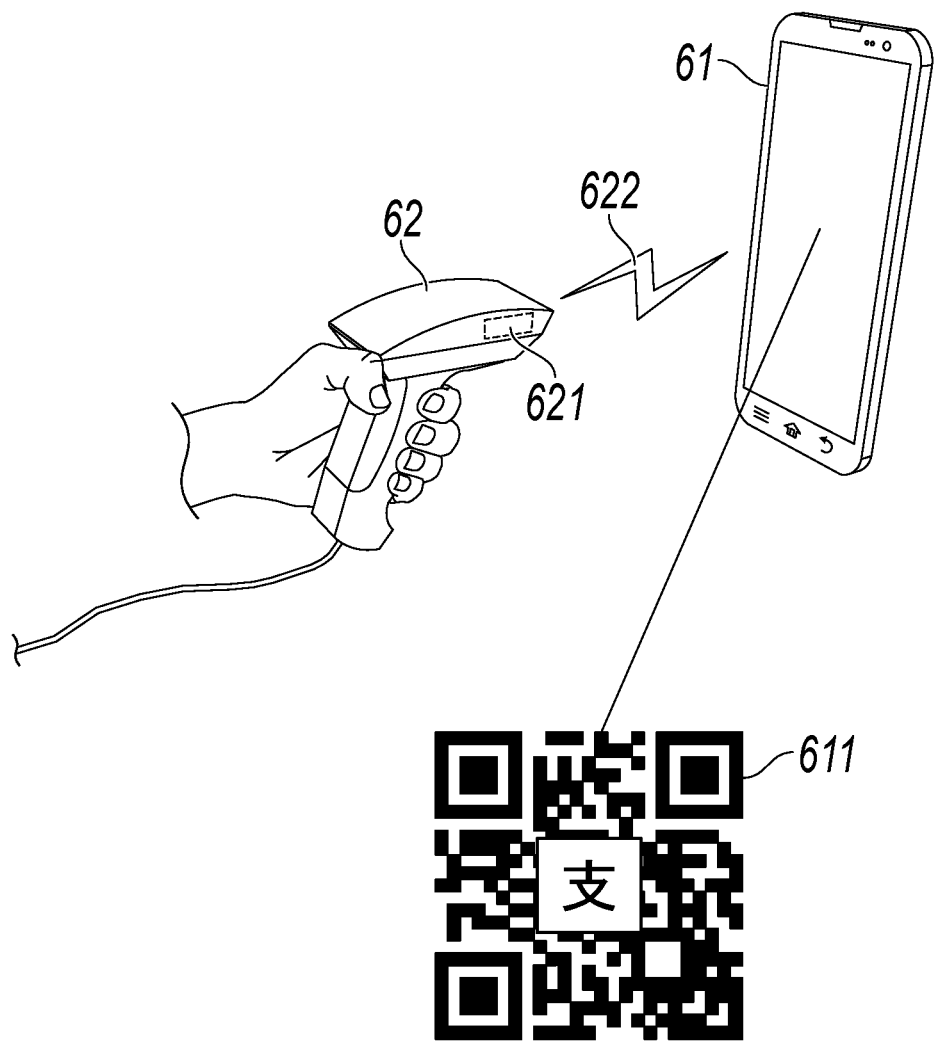
FIG. 6 is a structural diagram illustrating an image display system, according to an implementation of the present specification.

FIG. 6 is a structural diagram illustrating another image display system, according to an implementation of the present specification. The system 600 shown in FIG. 6 can include an end-user device 61 of a user and a scanning device 62.

The end-user device 61 can be configured to display an image 611 to be scanned.

The scanning device 62 can be configured to scan the image 611 displayed by the end-user device 61, to perform a related service procedure. For example, the end-user device 61 can display a payment code image (as shown in FIG. 6) in a payment scenario, and therefore the scanning device 62 can complete a collection procedure through code scanning. For another example, the end-user device 61 can display a ticket collection code image in a ticket collection scenario, and therefore the scanning device 62 can complete authentication through code scanning, to issue a bill (which can be a paper bill or an electronic bill).

The scanning device 62 can be further integrated with a detection device 621, and the detection device 621 can be configured to detect a distance between the scanning device 62 and the end-user device 61.

The end-user device 61 and the scanning device 62 can be integrated with short-range wireless communications modules, such as a Bluetooth (Bluetooth) module, an infrared (IrDA) module, a wireless local area network (Wi-Fi or WLAN mostly using a series of 802.11 protocols) module, a Wi-Fi direct (Wi-Fi Direct) module, an ultra-wideband (UWB) module, a ZigBee (ZigBee) module, and a near field communication (NFC) module, to implement short-range wireless signal transmission and reception. By using the short-range wireless communications modules, a short-range wireless connection 622 can be established between the end-user device 61 and the scanning device 62. As such, the detection device 621 can send the distance to the end-user device 61 through the short-range wireless connection 622 after detecting the distance between the scanning device 62 and the end-user device 61.

In actual use, the user can enable the end-user device 61 that displays the image 611 to be scanned to face the scanning device 62 at any location that is at a distance from the scanning device 62. The detection device 621 sends the detected distance to the end-user device 61. The end-user device 61 automatically adjusts a size of the displayed image 611 (for example, increases the size of the image 611 or decreases the size of the image 611) based on the received distance, thereby helping the scanning device 62 efficiently perform scanning.

Figure 7:
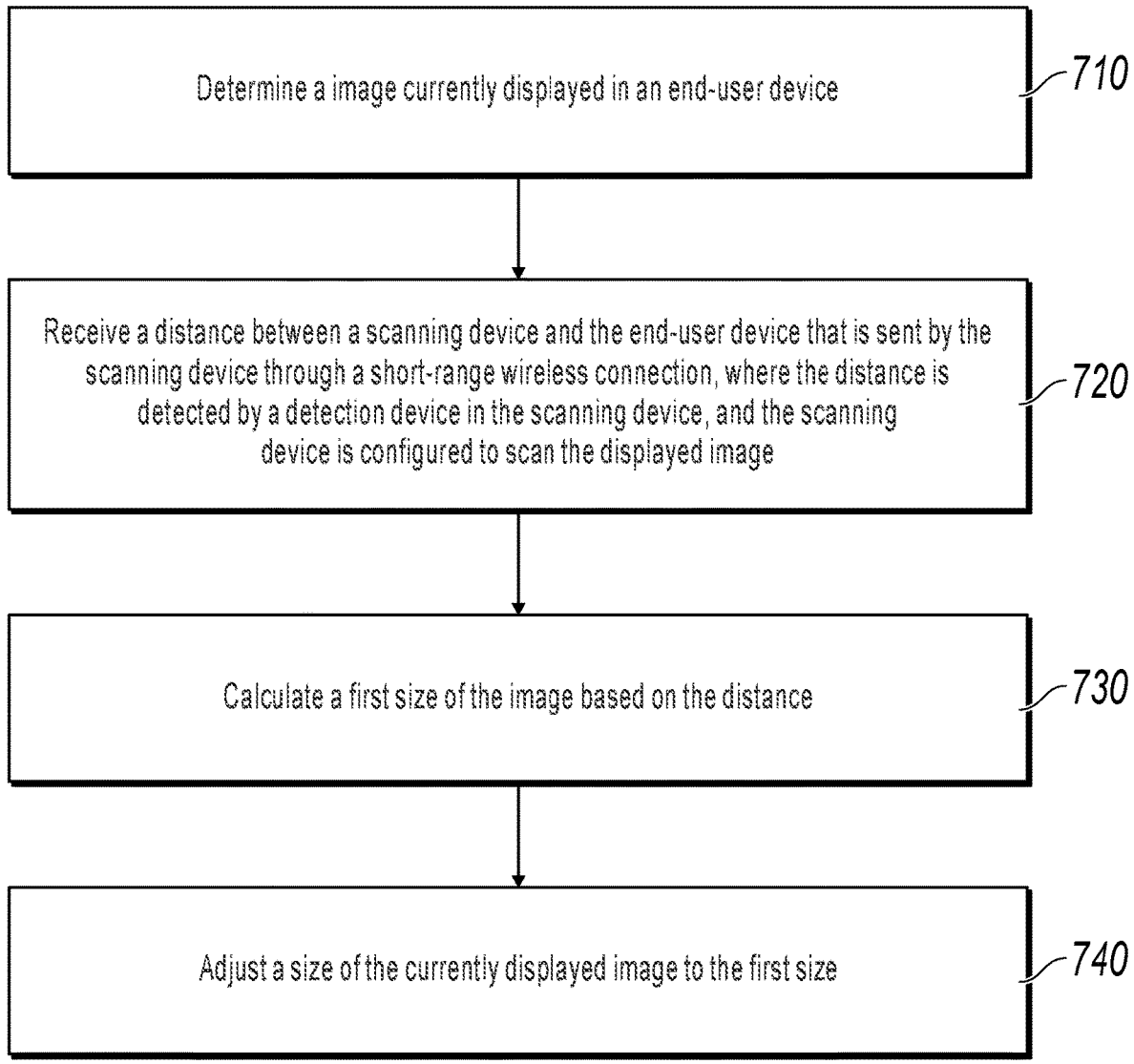
FIG. 7 is a flowchart illustrating an image display method, according to an implementation of the present specification.

The following describes an implementation of an image display method in the present specification with reference to an example shown in FIG. 7. As shown in FIG. 7, the method can include the following steps.

Step 710: Determine an image currently displayed in an end-user device.

The present step is the same as step 110. Details are omitted here for simplicity.

Step 720: Receive a distance between a scanning device and the end-user device that is sent by the scanning device through a short-range wireless connection, where the distance is detected by a detection device in the scanning device, and the scanning device is configured to scan the displayed image.

The short-range wireless connection includes one of Bluetooth, infrared, a wireless local area network, Wi-Fi, ultra-wideband communication, ZigBee, and near field communication.

The detection device can include a distance sensor and/or a camera. The distance sensor and the camera are the same as those in the previous implementations. Details are omitted here for simplicity.

It is worthwhile to note that, when a short-range wireless module is integrated into the scanning device, the distance detected by the detection device can be sent by the detection device through the short-range wireless connection.

In another implementation, the short-range wireless module can be alternatively integrated into the detection device. Therefore, the distance can be directly sent by the detection device through the short-range wireless connection without passing through the scanning device.

Step 730: Calculate a first size of the image based on the distance.

The present step is the same as step 130. Details are omitted here for simplicity.

Step 740: Adjust a size of the currently displayed image to the first size.

The present step is the same as step 140. Details are omitted here for simplicity.

A difference between the present implementation and the previous implementation is as follows: In the present implementation, the detection device is located in the scanning device, the scanning device establishes the short-range wireless connection to the end-user device, and the distance is sent by the scanning device through the short-range wireless connection.

Figure 8:
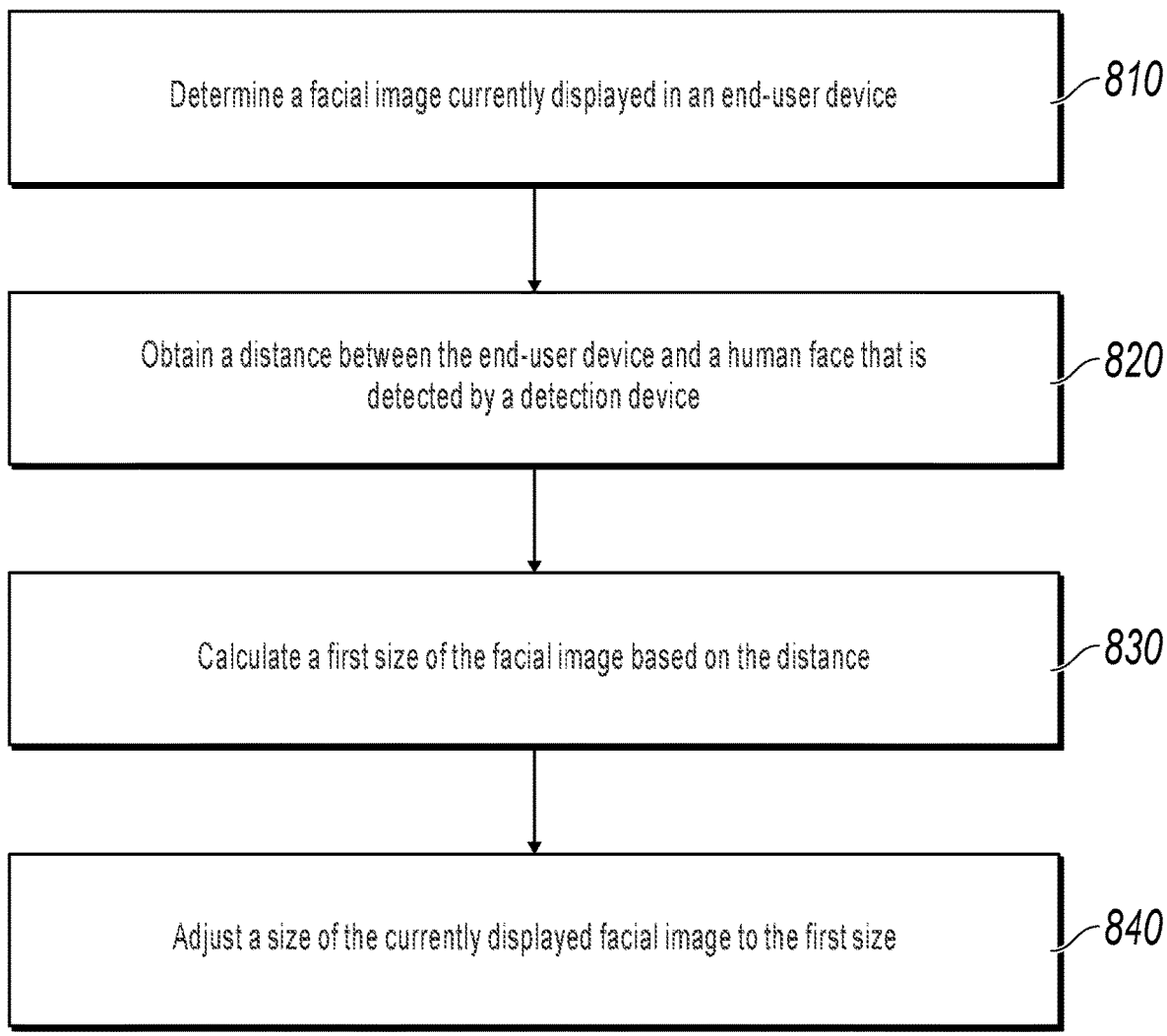
FIG. 8 is a flowchart illustrating an image display method, according to an implementation of the present specification.

The following describes an implementation of an image display method in the present specification with reference to an example shown in FIG. 8. As shown in FIG. 8, the method can include the following steps:

Step 810: Determine a facial image currently displayed in an end-user device.

Step 820: Obtain a distance between the end-user device and a human face that is detected by a detection device.

Step 830: Calculate a first size of the facial image based on the distance.

Step 840: Adjust a size of the currently displayed facial image to the first size.

In a facial recognition process, a user usually needs to limit the facial image photographed by a camera to a predetermined range. For a distance reason, the user needs to continually move a mobile device to make the size of the facial image just satisfy a recognition need. The present implementation can be applied to facial recognition. The detection device in the end-user device detects the distance between the end-user device and the human face; then calculates, based on the distance, the first size for conveniently performing facial recognition on the facial image; and finally adjusts the size of the displayed facial image to the first size. The facial image of an adjusted size is recognized conveniently, thereby increasing a facial recognition success rate.

Corresponding to the previous implementations of the image display methods, the present specification further provides implementations of image display devices. The device implementations can be implemented by using software, hardware, or a combination of hardware and software. Software implementation is used as an example. As a logic device, the device is formed by reading a corresponding computer program instruction in a nonvolatile memory to a memory by a processor of a device that the device is located in. In terms of hardware, in addition to a processor, a network interface, a memory, and a nonvolatile memory, a hardware structure of the device that the image display device in the present specification is located in usually can include other hardware based on an actual function of the image display device. Details are omitted here for simplicity.

Figure 9:
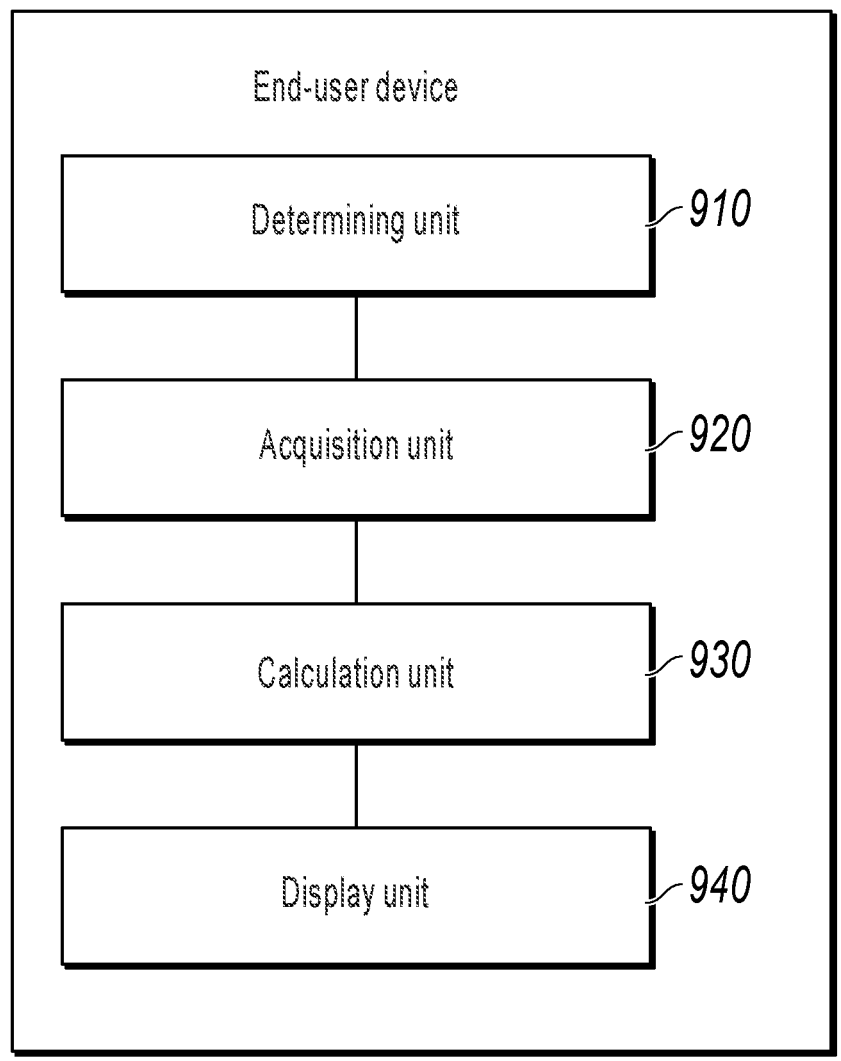
FIG. 9 is a schematic module diagram illustrating an image display device, according to an implementation of the present specification.

FIG. 9 is a module diagram illustrating an image display device, according to an implementation of the present specification. The device corresponds to the implementation shown in FIG. 2, and the device includes the following: a determining unit 910, configured to determine an image currently displayed in an end-user device; an acquisition unit 920, configured to obtain a distance between the end-user device and a scanning device that is detected by a detection device, where the scanning device is configured to scan the displayed image; a calculation unit 930, configured to calculate a first size of the image based on the distance; and a display unit 940, configured to adjust a size of the currently displayed image to the first size.

In an optional implementation, the detection device includes a distance sensor, and the acquisition unit 920 is configured to: obtain the distance between the end-user device and the scanning device that is detected by the distance sensor.

In an optional implementation, the detection device includes a camera of the end-user device, and the acquisition unit 920 includes the following: an acquisition subunit, configured to obtain an image of the scanning device captured by the camera; and a determining subunit, configured to determine the distance between the end-user device and the scanning device based on the image of the scanning device.

In an optional implementation, the camera of the end-user device includes a rotary camera or a front-facing camera.

In an optional implementation, the scanning device includes a code scanner.

In an optional implementation, the image includes a graphic code.

In an optional implementation, the detection device is a third-party detection device other than the end-user device, and the detection device establishes a short-range wireless connection to the end-user device.

The acquisition unit 920 is configured to: receive the distance between the end-user device and the scanning device that is sent by the detection device through the short-range wireless connection.

In an optional implementation, the detection device is located in the scanning device, and the scanning device establishes a short-range wireless connection to the end-user device.

The acquisition unit 920 is configured to: receive the distance between the scanning device and the end-user device that is sent by the scanning device through the short-range wireless connection, where the distance is detected by the detection device in the scanning device.

In an optional implementation, the short-range wireless connection includes one of Bluetooth, infrared, a wireless local area network, Wi-Fi, ultra-wideband communication, ZigBee, and near field communication.

Figure 10:
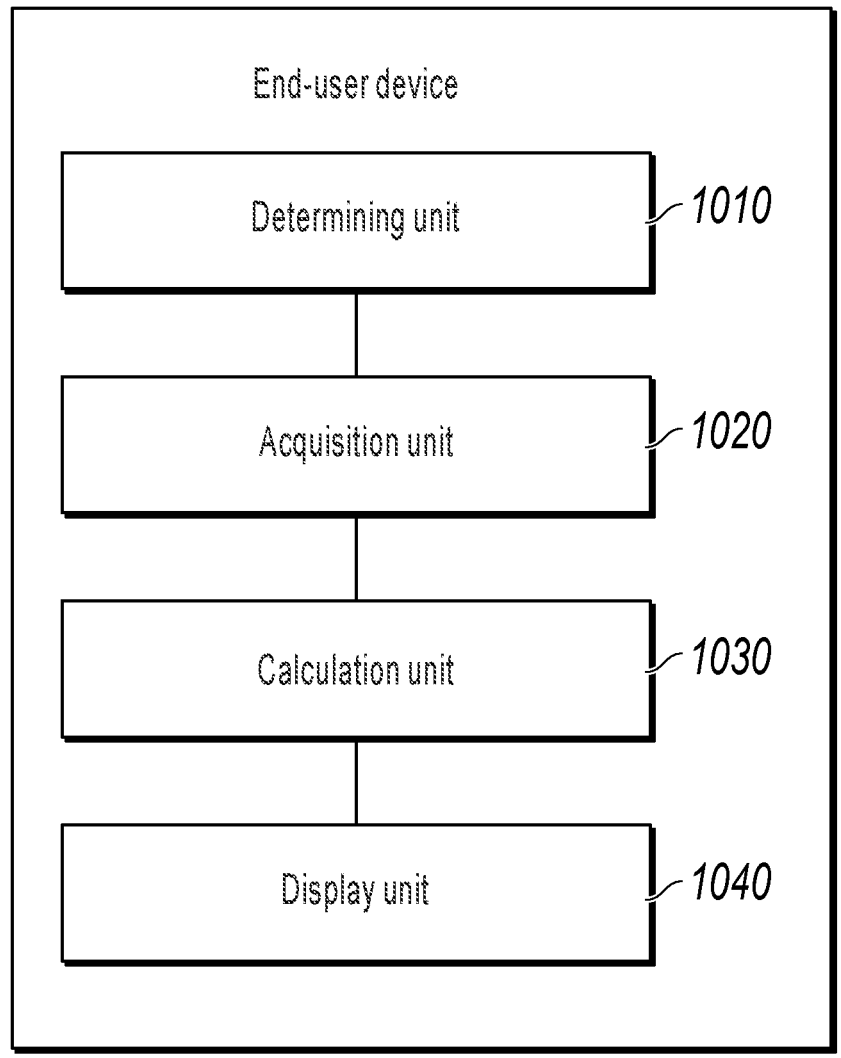
FIG. 10 is a schematic module diagram illustrating an image display device, according to an implementation of the present specification.

FIG. 10 is a module diagram illustrating an image display device, according to an implementation of the present specification. The device corresponds to the implementation shown in FIG. 8, and the device includes the following: a determining unit 1010, configured to determine a facial image currently displayed in an end-user device; an acquisition unit 1020, configured to obtain a distance between the end-user device and a human face that is detected by a detection device; a calculation unit 1030, configured to calculate a first size of the facial image based on the distance; and a display unit 1040, configured to adjust a size of the currently displayed facial image to the first size.

The system, device, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For specific implementation processes of functions and roles of the units in the device, references can be made to implementation processes of corresponding steps in the method. Details are omitted here for simplicity.

Because a device implementation basically corresponds to a method implementation, for related parts, references can be made to related descriptions in the method implementation. The described device implementation is merely an example. The units described as separate parts can or cannot be physically separate, and parts displayed as units can or cannot be physical units, in other words, can be located in one location, or can be distributed on a plurality of network units. A part or all of the modules can be selected based on actual needs to achieve the objectives of the solutions of the present specification. A person of ordinary skill in the art can understand and implement the implementations of the present specification without creative efforts.

FIG. 9 is a schematic diagram illustrating an internal function module and a structure of an image display device. Essentially, an execution body can be an electronic device, including the following: a processor; and a memory, configured to store an instruction that can be executed by the processor.

The processor is configured to: determine an image currently displayed in an end-user device; obtain a distance between the end-user device and a scanning device that is detected by a detection device, where the scanning device is configured to scan the displayed image; calculate a first size of the image based on the distance; and adjust a size of the currently displayed image to the first size.

Optionally, the detection device includes a distance sensor, and the obtaining a distance between the end-user device and a scanning device that is detected by a detection device includes the following: obtaining the distance between the end-user device and the scanning device that is detected by the distance sensor.

Optionally, the detection device includes a camera of the end-user device, and the obtaining a distance between the end-user device and a scanning device that is detected by a detection device includes the following: obtaining an image of the scanning device captured by the camera; and determining the distance between the end-user device and the scanning device based on the image of the scanning device.

Optionally, the camera of the end-user device includes a rotary camera or a front-facing camera.

Optionally, the scanning device includes a code scanner.

Optionally, the image includes a graphic code.

Optionally, the detection device is a third-party detection device other than the end-user device, and the detection device establishes a short-range wireless connection to the end-user device.

The obtaining a distance between the end-user device and a scanning device that is detected by a detection device includes the following: receiving the distance between the end-user device and the scanning device that is sent by the detection device through the short-range wireless connection.

Optionally, the detection device is located in the scanning device, and the scanning device establishes a short-range wireless connection to the end-user device.

The obtaining a distance between the end-user device and a scanning device that is detected by a detection device includes the following: receiving the distance between the scanning device and the end-user device that is sent by the scanning device through the short-range wireless connection, where the distance is detected by the detection device in the scanning device.

Optionally, the short-range wireless connection includes one of Bluetooth, infrared, a wireless local area network, Wi-Fi, ultra-wideband communication, ZigBee, and near field communication.

FIG. 10 is a schematic diagram illustrating an internal function module and a structure of an image display device. Essentially, an execution body can be an electronic device, including the following: a processor; and a memory, configured to store an instruction that can be executed by the processor.

The processor is configured to: determine a facial image currently displayed in an end-user device; obtain a distance between the end-user device and a human face that is detected by a detection device; calculate a first size of the facial image based on the distance; and adjust a size of the currently displayed facial image to the first size.

In the previous implementation of the electronic device, it should be understood that the processor can be a central processing unit (CPU), or can be another general purpose processor, a digital signal processor (DSP), an application-specific integrated circuit (ASIC), etc. The general purpose processor can be a microprocessor, or the processor can be any conventional processor, etc. The memory can be a read-only memory (ROM), a random access memory (RAM), a flash memory, a hard disk, or a solid state disk. The steps of the methods disclosed in the implementations of the present disclosure can be directly performed by a hardware processor, or performed by a combination of hardware and software modules in the processor.

The implementations in the present specification are all described in a progressive way. For the same or similar parts of the implementations, references can be made to the implementations. Each implementation focuses on a difference from other implementations. Particularly, the implementation of the electronic device is basically similar to a method implementation, and therefore is described briefly. For related parts, references can be made to partial descriptions of the method implementation.

A person skilled in the art can easily figure out another implementation of the present specification after considering the present specification and practicing the present disclosure. The present specification is intended to cover any variations, functions, or adaptive changes of the present specification. These variations, functions, or adaptive changes comply with general principles of the present specification, and include common knowledge or a commonly used technical means that is not disclosed in the technical field of the present specification. The present specification and the implementations are merely considered as examples. The actual scope and the spirit of the present specification are described by the following claims.

It should be understood that the present specification is not limited to the earlier described accurate structures that are shown in the accompanying drawings, and various modifications and changes can be made without departing from the scope of the present specification. The scope of the present specification is limited only by the appended claims.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
displaying, by an end-user device for a scanning device, a code image at a first size, wherein the end-user device comprises at least one camera, wherein the code image includes at least one of a payment code image or a ticket collection code image, and wherein the end-user device stores a predetermined mapping relationship between distance and size; and
after displaying the code image at the first size:
emitting, by a distance sensor disposed in the end-user device, an infrared ray at a first time;
receiving, by the distance sensor, a reflection of the infrared ray from an object the scanning device at a second time;
calculating, by the end-user device, a first distance based on a time difference between the first time and the second time;
obtaining an image of the scanning device captured by the at least one camera;
calculating, by the end-user device, a second distance based on the image of the scanning device using an image processing algorithm;
jointly determining a distance between the end-user device and the scanning device according to the first distance calculated based on the time difference and the second distance calculated based on the image of the scanning device;
determining, by the end-user device, a second optimized size based on a screen size of the end-user device, the distance between the end-user device and the scanning device, and the predetermined mapping relationship; and displaying, by the end-user device for the scanning device, the code image at the second optimized size as being determined by the screen size of the end-user device, the distance between the end-user device and the scanning device, and the predetermined mapping relationship.

2. The computer-implemented method of claim 1, wherein the code image comprises a two-dimensional code.

3. The computer-implemented method of claim 1, wherein the at least one camera comprises a rotary camera or a front-facing camera.

4. The computer-implemented method of claim 1, wherein a third-party detection device having a short-range wireless connection to the end-user device detects the distance between the end-user device and the scanning device, and the method further comprises:

receiving, by the end-user device and from the third-party detection device, the distance between the end-user device and the scanning device through the short-range wireless connection, wherein the short-range wireless connection comprises one of Bluetooth, infrared, a wireless local area network, Wi-Fi, ultra-wideband communication, ZigBee, and near field communication.

5. The computer-implemented method of claim 4, wherein the third-party detection device is in the scanning device, and the scanning device establishes the short-range wireless connection to the end-user device.

6. The computer-implemented method of claim 1, wherein the first size is a default size, and displaying the code image at the second optimized size comprises at least one of:

automatically increasing the displayed code image at the first size to the second optimized size if the second optimized size is greater than the first size;

automatically decreasing the displayed code image at the first size to the second optimized size if the second optimized size is less than the first size; or maintaining the displayed code image at the first size if the second optimized size equals to the first size.

7. A non-transitory, computer-readable medium storing one or more instructions executable by a computer system to perform operations comprising:

displaying, by an end-user device for a scanning device, a code image at a first size, wherein the end-user device comprises at least one camera, wherein the code image includes at least one of a payment code image or a ticket collection code image, and wherein the end-user device stores a predetermined mapping relationship between distance and size; and after displaying the code image at the first size:

emitting, by a distance sensor disposed in the end-user device, an infrared ray at a first time;

receiving, by the distance sensor, a reflection of the infrared ray from the scanning device at a second time;

calculating, by the end-user device, a first distance based on a time difference between the first time and the second time;

obtaining an image of the scanning device captured by the at least one camera;

calculating, by the end-user device, a second distance based on the image of the scanning device using an image processing algorithm;

jointly determining a distance between the end-user device and the scanning device according to the first distance calculated based on the time difference and the second distance calculated based on the image of the scanning device;

determining, by the end-user device, a second optimized size based on a screen size of the end-user device, the distance between the end-user device and the scanning device, and the predetermined mapping relationship; and displaying, by the end-user device for the scanning device, the code image at the second optimized size as being determined by the screen size of the end-user device, the distance between the end-user device and the scanning device, and the predetermined mapping relationship.

8. The non-transitory, computer-readable medium of claim 7, wherein the code image comprises a two-dimensional code.

9. The non-transitory, computer-readable medium of claim 7, wherein the at least one camera comprises a rotary camera or a front-facing camera.

10. The non-transitory, computer-readable medium of claim 7, wherein a third-party detection device having a short-range wireless connection to the end-user device detects the distance between the end-user device and the scanning device, and the operations further comprise:

receiving, by the end-user device and from the third-party detection device, the distance between the end-user device and the scanning device through the short-range wireless connection, wherein the short-range wireless connection comprises one of Bluetooth, infrared, a wireless local area network, Wi-Fi, ultra-wideband communication, ZigBee, and near field communication.

11. The non-transitory, computer-readable medium of claim 10, wherein the third-party detection device is in the scanning device, and the scanning device establishes the short-range wireless connection to the end-user device.

12. The non-transitory, computer-readable medium of claim 7, wherein the first size is a default size, and displaying the code image at the second optimized size comprises at least one of:

automatically increasing the displayed code image at the first size to the second optimized size if the second optimized size is greater than the first size;

automatically decreasing the displayed code image at the first size to the second optimized size if the second optimized size is less than the first size; or maintaining the displayed code image at the first size if the second optimized size equals to the first size.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

displaying, by an end-user device for a scanning device, a code image at a first size, wherein the end-user device comprises at least one camera, wherein the code image includes at least one of a payment code image or a ticket collection code image, and wherein the end-user device stores a predetermined mapping relationship between distance and size; and after displaying the code image at the first size:
- emitting, by a distance sensor disposed in the end-user device, an infrared ray at a first time;
- receiving, by the distance sensor, a reflection of the infrared ray from the scanning device at a second time;
- calculating, by the end-user device, a first distance based on a time difference between the first time and the second time;
- obtaining an image of the scanning device captured by the at least one camera;
- calculating, by the end-user device, a second distance based on the image of the scanning device using an image processing algorithm;
- jointly determining a distance between the end-user device and the scanning device according to the first distance calculated based on the time difference and the second distance calculated based on the image of the scanning device;
- determining, by the end-user device, a second optimized size based on a screen size of the end-user device, the distance between the end-user device and the scanning device, and the predetermined mapping relationship; and
- displaying, by the end-user device for the scanning device, the code image at the second optimized size as being determined by the screen size of the end-user device, the distance between the end-user device and the scanning device, and the predetermined mapping relationship.

14. The computer-implemented system of claim 13, wherein the code image comprises a two-dimensional code.

15. The computer-implemented system of claim 13, wherein the at least one camera comprises a rotary camera or a front-facing camera.

16. The computer-implemented system of claim 13, wherein a third-party detection device having a short-range wireless connection to the end-user device detects the distance between the end-user device and the scanning device, and the operations further comprise:
- receiving, by the end-user device and from the third-party detection device, the distance between the end-user device and the scanning device through the short-range wireless connection, wherein the short-range wireless connection comprises one of Bluetooth, infrared, a wireless local area network, Wi-Fi, ultra-wideband communication, ZigBee, and near field communication.

17. The computer-implemented system of claim 16, wherein the third-party detection device is in the scanning device, and the scanning device establishes the short-range wireless connection to the end-user device.

18. The computer-implemented method of claim 1, wherein determining the second optimized size comprises:
- determining the second optimized size based on the predetermined mapping relationship and the distance between the end-user device and the scanning device; and
- in response to determining that the second optimized size is larger than the screen size of the end-user device, determining the second optimized size as the screen size of the end-user device.

19. The non-transitory, computer-readable medium of claim 7, wherein determining the second optimized size comprises:
- determining the second optimized size based on the predetermined mapping relationship and the distance between the end-user device and the scanning device; and
- in response to determining that the second optimized size is larger than the screen size of the end-user device, determining the second optimized size as the screen size of the end-user device.

20. The computer-implemented system of claim 13, wherein determining the second optimized size comprises:
- determining the second optimized size based on the predetermined mapping relationship and the distance between the end-user device and the scanning device; and
- in response to determining that the second optimized size is larger than the screen size of the end-user device, determining the second optimized size as the screen size of the end-user device.

* * * * *

UNITED STATES PATENT AND TRADEMARK OFFICE
CERTIFICATE OF CORRECTION

PATENT NO. : 11,064,112 B2
APPLICATION NO. : 16/686415
DATED : July 13, 2021
INVENTOR(S) : Lingnan Shen et al.

Page 1 of 1

It is certified that error appears in the above-identified patent and that said Letters Patent is hereby corrected as shown below:

In the Claims

In Column 14, Line 51, delete "from an object the scanning" and insert -- from the scanning --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*